(12) United States Patent
Fang

(10) Patent No.: US 9,200,226 B1
(45) Date of Patent: Dec. 1, 2015

(54) ESTERS OF ALKOXYLATED QUATERNARY AMMONIUM SALTS AND FUELS CONTAINING THEM

(71) Applicant: AFTON CHEMICAL CORPORATION, Richmond, VA (US)

(72) Inventor: Xinggao Fang, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 14/608,550

(22) Filed: Jan. 29, 2015

(51) Int. Cl.
*C10L 10/04* (2006.01)
*C10L 1/22* (2006.01)
*F02B 43/02* (2006.01)

(52) U.S. Cl.
CPC .................. *C10L 10/04* (2013.01); *C10L 1/221* (2013.01); *F02B 43/02* (2013.01); *C10L 2200/0259* (2013.01); *C10L 2230/22* (2013.01); *C10L 2270/023* (2013.01); *C10L 2270/026* (2013.01)

(58) Field of Classification Search
CPC . C10L 10/04; C10L 1/221; C10L 2200/0259; C10L 2270/023; C10L 2230/22
See application file for complete search history.

(56) References Cited

U.S. PATENT DOCUMENTS

| | | |
|---|---|---|
| 2,589,674 A | 3/1952 | Cook et al. |
| 3,015,668 A | 1/1962 | Kozikowski |
| 3,401,119 A | 9/1968 | Froehlich |
| 4,180,643 A | 12/1979 | Moss et al. |
| 4,482,357 A | 11/1984 | Hanlon |
| 4,621,141 A | 11/1986 | Chibnik |
| 4,631,071 A | 12/1986 | Axelrod et al. |
| 4,657,562 A | 4/1987 | Axelrod et al. |
| 5,575,823 A | 11/1996 | Wallace et al. |
| 5,713,966 A | 2/1998 | Cherpeck |
| 6,964,940 B1 | 11/2005 | Treybig et al. |
| 7,947,093 B2 | 5/2011 | Barton et al. |
| 8,147,569 B2 | 4/2012 | Barton et al. |
| 8,153,570 B2 | 4/2012 | Barton et al. |
| 8,529,643 B2 | 9/2013 | Galante-Fox et al. |
| 8,758,456 B2 | 6/2014 | Fang et al. |
| 8,852,297 B2 | 10/2014 | Fang et al. |
| 2006/0182696 A1 | 8/2006 | Patil et al. |
| 2008/0113890 A1 | 5/2008 | Moreton et al. |
| 2011/0258917 A1 | 10/2011 | Garcia et al. |
| 2012/0010112 A1 | 1/2012 | Grabarse et al. |
| 2012/0138004 A1* | 6/2012 | Stevenson et al. ............. 123/1 A |
| 2013/0031827 A1 | 2/2013 | Reid et al. |
| 2013/0031828 A1 | 2/2013 | Reid et al. |
| 2013/0118062 A1 | 5/2013 | Fang et al. |
| 2013/0233267 A1 | 9/2013 | Barbour |

FOREIGN PATENT DOCUMENTS

EP 0336267 A2 10/1989

* cited by examiner

*Primary Examiner* — Cephia D Toomer
(74) *Attorney, Agent, or Firm* — Luedeka Neely Group, P.C.

(57) ABSTRACT

A fuel soluble additive for a gasoline or diesel engine, a method for making the additive, a fuel containing the additive, a method for improving performance of fuel injectors for an engine. The fuel soluble additive includes an esterified quaternary ammonium salt derived from a tertiary amine, an epoxide, a proton donor and an anhydride.

19 Claims, No Drawings

ESTERS OF ALKOXYLATED QUATERNARY AMMONIUM SALTS AND FUELS CONTAINING THEM

TECHNICAL FIELD

The disclosure is directed to a fuel additive and to fuels that include the additive that are useful for improving the performance of fuel injected engines. In particular the disclosure is directed to an esterified alkoxylated quaternary ammonium salt fuel additive that is effective to enhance the performance of fuel injectors for engines.

BACKGROUND AND SUMMARY

It has long been desired to maximize fuel economy, power and driveability in fuel powered vehicles while enhancing acceleration, reducing emissions, and preventing hesitation. Over the years, detergent compositions for fuels have been developed. Detergent compositions known in the art for use in fuels include compositions that may include polyalkylene succinimides, polyamines and polyalkyl substituted Mannich compounds. Detergents are suitable for keeping soot and sludge suspended in a fluid, however the foregoing detergents are not particularly effective for cleaning surfaces once deposits have formed on the surfaces.

Fuel compositions for fuel injected engines often produce undesirable deposits in the internal engine surfaces and fuel filters. Improved compositions that can prevent deposit build up or clean out deposits from engine parts are highly desirable. Some additives that may be effective for improving power recovery in engines may be detrimental to fuel injectors, causing injector sticking. Accordingly, improved compositions that can prevent deposit build up and prevent injector sticking, as well as restore engine power are highly desirable. Ideally, the same composition that can clean up dirty fuel injectors restoring performance to the previous "as new" condition would be equally desirable and valuable in the attempt to reduce air borne exhaust emissions from the engines.

Quaternary ammonium salts are known effective detergents to clean out undesirable engine deposits. For example quaternary ammonium salts derived from the reaction of a tertiary amine compound with certain aromatic esters are good detergents. Alkoxylated quaternary ammonium compounds are particularly effective as fuel detergents. However there is still a need for quaternary ammonium additives that are not only effective as fuel detergents but also have improved handling properties and package stabilities.

For example, certain alkoxylated quaternary ammonium compounds are very polar and have limited solubility in hydrocarbon fuels. Some quaternary ammonium compounds are highly viscose or pasty materials that require special handling, such as heating, in order to provide a fuel additive package. Synthesis of such alkoxylated quaternary ammonium compounds often requires the presence of alcoholic solvents which not only may need to be removed subsequently to making the additive but the alcoholic solvents may also cause unnecessary side reaction products during the synthesis steps. Accordingly, there continues to be a need for fuel additives that are effective for improving the power performance of engines, without causing fuel injector sticking and that can be incorporated into a fuel composition without special handling and that can have better package compatibility and stability.

In accordance with the disclosure, exemplary embodiments provide a fuel soluble additive for a gasoline or diesel engine, a fuel containing the additive, a method for improving performance of fuel injectors and a method for cleaning fuel injectors for an engine. The fuel soluble additive includes an esterified quaternary ammonium salt derived from a tertiary amine, an epoxide, a proton donor and an anhydride. In another embodiment, the ester of alkoxylated quaternary ammonium salts may be substantially devoid of hydroxyl groups.

Another embodiment of the disclosure provides a method of improving the injector performance of a fuel injected engine. The method includes operating the engine on a diesel fuel composition containing a major amount of diesel fuel and from about 5 to about 100 ppm by weight based on a total weight of the fuel composition of an esterified quaternary ammonium salt derived from a tertiary amine, an epoxide, a proton donor selected from a carboxylic acid and an alkyl phenol and an anhydride.

A further embodiment of the disclosure provides a method for making an esterified quaternary ammonium salt fuel additive. The method includes reacting a tertiary amine in the presence of an epoxide, a carboxylic acid and an anhydride.

In another embodiment of the fuel additive, the tertiary amine is an amido amine is derived from a fatty acid.

An advantage of the fuel additive described herein is that the additive may not only reduce the amount of deposits forming on fuel injectors, but the additive may also be effective to clean up dirty fuel injectors sufficient to provide improved power recovery to the engine. Other advantages of the additives described herein are that the additives do not require the presence of an alcohol solvent that must be removed subsequent to the synthesis step and the additives are more readily soluble in fuels and fuel additive compositions without special handling techniques.

Additional embodiments and advantages of the disclosure will be set forth in part in the detailed description which follows, and/or can be learned by practice of the disclosure. It is to be understood that both the foregoing general description and the following detailed description are exemplary and explanatory only and are not restrictive of the disclosure, as claimed.

DETAILED DESCRIPTION OF EXEMPLARY EMBODIMENTS

The fuel additive component of the present application may be used in a minor amount in a major amount of fuel and may be added to the fuel directly or added as a component of an additive concentrate to the fuel. A particularly suitable fuel additive component for improving the operation of internal combustion engines may in one embodiment be made by reacting a tertiary amine of the formula

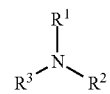

wherein each of $R^1$, $R^2$, and $R^3$ is selected from hydrocarbyl groups containing from 1 to 200 carbon atoms, such as from 1 to 50 carbon atoms, or from 1 to 24 carbon atoms, with a carboxylic acid containing from 1 to 200 carbon atoms and a quaternizing agent and an anhydride to provide an esterified alkoxylated quaternary ammonium salt. In another embodiment the reaction to make the quaternary ammonium salt may be conducted in the presence of a protonating agent having an acid disassociation constant ($pK_a$) of less than about 13, such as a carboxylic acid or an alkyl phenol. The esterified quaternary ammonium salt may be made from the quaternary ammonium salt and an anhydride. The anhydride may be selected from cyclic and non-cyclic anhydrides including, but not limited to, acetic anhydride, polyisobutenyl succinic anhydride and hydrocarbyl alkylene anhydride. The alkoxylated quaternary ammonium salt may also be derived from an amido amine and a quaternizing agent in the presence of a protonating agent and anhydride. The protonating agent may be obtained from a carboxylic acid, alkyl phenol or from the amido amine derived from a fatty acid wherein the reaction product containing the amido amine has an acid number ranging from about 1 to about 200 mg KOH/g. Regardless of how the esterified alkoxylated quaternary ammonium salt is made, a key feature of the disclosure is that the amine contains at least one tertiary amino group.

As used herein, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, amino, alkylamino, and sulfoxy);

(3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

As used herein, the term "major amount" is understood to mean an amount greater than or equal to 50 wt. %, for example from about 80 to about 98 wt. % relative to the total weight of the composition. Moreover, as used herein, the term "minor amount" is understood to mean an amount less than 50 wt. % relative to the total weight of the composition.

Amine Compound

In one embodiment, a tertiary amine including diamines and polyamines may be reacted with a $C_1$ to $C_{54}$ carboxylic acid to form an amido amine and the amido amine may be subsequently reacted with a quaternizing agent. Suitable tertiary amido amine compounds of the formula

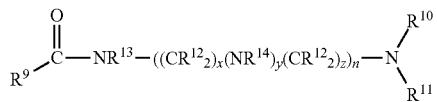

may be used, wherein each of $R^{10}$, and $R^{11}$ is selected from hydrocarbyl groups containing from 1 to 50 carbon atoms, each $R^9$, $R^{12}$, $R^{13}$ and $R^{14}$ may be independently selected from hydrogen or a hydrocarbyl group, x may range from 1 to 6, y may be 0 or 1, z may be 1 to 6, and n may range from 1 to 6. Each hydrocarbyl group $R^9$ to $R^{14}$ may independently be linear, branched, substituted, cyclic, saturated, unsaturated, or contain one or more hetero atoms. Suitable hydrocarbyl groups may include, but are not limited to alkyl groups, aryl groups, alkylaryl groups, arylalkyl groups, alkoxy groups, aryloxy groups, amino groups, and the like. Particularly suitable hydrocarbyl groups may be linear or branched alkyl groups. A representative example of an amine reactant which may be amidized and quaternized to yield compounds disclosed herein include for example, but are not limited to, dimethyl amino propyl amine.

If the amine contains any primary or secondary amino groups, it may be desirable to alkylate the primary or secondary amino groups to a tertiary amino group prior to quaternizing the amido amine. In one embodiment, alkylation of primary amines and secondary amines or mixtures with tertiary amines may be exhaustively or partially alkylated to a tertiary amine and further alkoxylated to a quaternary salt.

When the amine has a primary or secondary amine group, the amine may be converted to an amido amine by reacting the amine with a $C_1$ to $C_{54}$ carboxylic acid. The acid may be a monoacid, a dimer acid, or a trimer acid. The acid may be selected from the group consisting of formic acid, acetic acid, propionic acid, butyric acid, caprylic acid, capric acid, lauric acid, myristic acid, palmitic acid, stearic, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, and the dimer and trimer acids thereof. When reacted with the amine, the reaction product may be a $C_1$-$C_{54}$-alkyl or alkenyl-substituted amido amine such as a $C_1$-$C_{54}$-alkyl or alkenyl-substituted amido propyldimethylamine.

Quaternizing Agent

A suitable quaternizing agents may be selected from the group consisting hydrocarbyl epoxides of the formula:

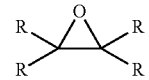

wherein each R is independently selected from H and a $C_1$ to $C_{50}$ hydrocarbyl group, and polyepoxides. Non-limiting examples of suitable epoxides that may be used as quaternizing agents may be selected from the group consisting of:
1,3-Butadiene diepoxide
Cyclohexene oxide
Cyclopentene oxide
Dicyclopentadiene dioxide
1,2,5,6-Diepoxycyclooctane
1,2,7,8-Diepoxyoctane
1,2-Epoxybutane
cis-2,3-Epoxybutane
3,4-Epoxy-1-butene 3,4-Epoxycyclohexylmethyl 3,4-epoxycyclohexanecarboxylate
1,2-Epoxydodecane
1,2-Epoxyhexadecane
1,2-Epoxyhexane
1,2-Epoxy-5-hexene
1,2-Epoxy-2-methylpropane
exo-2,3-Epoxynorbornane
1,2-Epoxyoctane
1,2-Epoxypentane
1,2-Epoxy-3-phenoxypropane
(2,3-Epoxypropyl)benzene
N-(2,3-Epoxypropyl)phthalimide
1,2-Epoxytetradecane
exo-3,6-Epoxy-1,2,3,6-tetrahydrophthalic anhydride
3,4-Epoxytetrahydrothiophene-1,1-dioxide
Isophorone oxide
Methyl-1,2-cyclopentene oxide
2-Methyl-2-vinyloxirane
α-Pinene oxide
Ethylene oxide
(±)-propylene oxide
Polyisobutene oxide
cis-Stilbene oxide
Styrene oxide
Tetracyanoethylene oxide
Tris(2,3-epoxypropyl) isocyanurate and combinations of two or more of the foregoing.

The Anhydride

The anhydride used to make the esterified quaternary ammonium salt may be selected from a wide variety of cyclic and non-cyclic anhydrides, including, but not limited to, acetic anhydride, oxalic anhydride, propionic anhydride, butyric anhydride, isobutyric anhydride, 4-pentanoic anhydride, valeric anhydride, isovaleric anhydride, trimethylacetic anhydride, hexanoic anhydride, maleic anhydride, malonic anhydride, 2-methylacrylic anhydride, succinic anhydride, dodecyl succinic anhydride, polyisobutenyl succinic anhydride, glutaric anhydride, cyclohexanecarboxylic anhydride, 1-cyclopentene-1,2-dicarboxylic anhydride, cyclobutane-1,2,3,4-tetracarboxylic dianhydride, benzoic anhydride, phthalic anhydride, naphthalenetetracarboxylic dianhydride, methyltetrahydrophthalic anhydride, pyromellitic dianhydride, trimellitic anhydride, and the like. The mole ratio of anhydride to tertiary amine may range from about 5:1 to about 1:5, such as 2:1 to 1:2 or from 0.8:1 to 1.2:1.

The esterified quaternary ammonium salts from tertiary amines may be made in one stage or two stages. The reaction may be carried out by contacting and mixing the tertiary amine with the olefin oxide in the reaction vessel wherein a carboxylic acid and an anhydride are added to the reaction mixture. In an alternative embodiment, the anhydride may be reacted with the quaternary ammonium salt in a separate reaction step to provide the esterified quaternary ammonium salt. In the two step reaction sequence, the protonating agent may be selected from either a carboxylic acid or phenol. In the one step reaction process, the protonating agent is selected from a carboxylic acid.

The carboxylic acid may be same acid used to make the amido amine or may be selected from any of the above listed carboxylic acids, fatty acids, formic acid, acetic acid, propionic acid, butyric acid, $C_1$-$C_{200}$ polymeric acid and mixtures thereof, such a polyolefinic mono- or di-carboxylic acid, polymeric polyacids and mixtures thereof, and the like. When used, the mole ratio of protonating agent per mole of epoxy equivalents added to the reaction mixture may range from about 1:5 to 5:1, for example from about 1:2 to about 2:1 moles of acid per mole of epoxy equivalents. In one embodiment, the anion of the quaternary ammonium salt is a carboxylate anion.

The reaction may be carried out at temperature ranging from about 30° to about 90° C., for example from about 45° to about 70° C. The reaction may be conducted by reacting any amount of tertiary amino groups to epoxy groups sufficient to provide a quaternary ammonium compound. In one embodiment a mole ratio of tertiary amino groups to epoxy groups may range from about 2:1 to about 1:2. When the reaction is completed volatiles and unreacted reagents may be removed from the reaction product by heating the reaction product under vacuum. The product may be diluted with mineral oil, diesel fuel, kerosene, or an inert hydrocarbon solvent to prevent the product from being too viscous, if necessary.

One or more additional optional compounds may be present in the fuel compositions of the disclosed embodiments. For example, the fuels may contain conventional quantities of nitrogen-containing detergents, cetane improvers, octane improvers, corrosion inhibitors, cold flow improvers (CFPP additive), pour point depressants, solvents, demulsifiers, lubricity additives, friction modifiers, amine stabilizers, combustion improvers, dispersants, antioxidants, heat stabilizers, conductivity improvers, metal deactivators, marker dyes, organic nitrate ignition accelerators, cyclomatic manganese tricarbonyl compounds, and the like. In some aspects, the compositions described herein may contain about 10 weight percent or less, or in other aspects, about 5 weight percent or less, based on the total weight of the additive concentrate, of one or more of the above additives. Similarly, the fuels may contain suitable amounts of conventional fuel blending components such as methanol, ethanol, dialkyl ethers, 2-ethylhexanol, and the like.

In some aspects of the disclosed embodiments, the fuel is a diesel fuel optionally containing an organic nitrate ignition accelerators that may be selected from aliphatic or cycloaliphatic nitrates in which the aliphatic or cycloaliphatic group is saturated, and that contain up to about 12 carbons may be used. Examples of organic nitrate ignition accelerators that may be used are methyl nitrate, ethyl nitrate, propyl nitrate, isopropyl nitrate, allyl nitrate, butyl nitrate, isobutyl nitrate, sec-butyl nitrate, tert-butyl nitrate, amyl nitrate, isoamyl nitrate, 2-amyl nitrate, 3-amyl nitrate, hexyl nitrate, heptyl nitrate, 2-heptyl nitrate, octyl nitrate, isooctyl nitrate, 2-ethylhexyl nitrate, nonyl nitrate, decyl nitrate, undecyl nitrate, dodecyl nitrate, cyclopentyl nitrate, cyclohexyl nitrate, methylcyclohexyl nitrate, cyclododecyl nitrate, 2-ethoxyethyl nitrate, 2-(2-ethoxyethoxyl)ethyl nitrate, tetrahydrofuranyl nitrate, and the like. Mixtures of such materials may also be used.

Examples of suitable optional metal deactivators useful in the compositions of the present application are disclosed in U.S. Pat. No. 4,482,357 issued Nov. 13, 1984, the disclosure of which is herein incorporated by reference in its entirety. Such metal deactivators include, for example, salicylidene-o-aminophenol, disalicylidene ethylenediamine, disalicylidene propylenediamine, and N,N'-disalicylidene-1,2-diaminopropane.

Suitable optional cyclomatic manganese tricarbonyl compounds which may be employed in the compositions of the present application include, for example, cyclopentadienyl manganese tricarbonyl, methylcyclopentadienyl manganese tricarbonyl, indenyl manganese tricarbonyl, and ethylcyclopentadienyl manganese tricarbonyl. Yet other examples of suitable cyclomatic manganese tricarbonyl compounds are disclosed in U.S. Pat. No. 5,575,823, issued Nov. 19, 1996, and U.S. Pat. No. 3,015,668, issued Jan. 2, 1962, both of which disclosures are herein incorporated by reference in their entirety.

Commercially available detergents may be used in combination with the reaction products described herein. Such detergents include but are not limited to succinimides, Mannich base detergents, polyetheramine detergents, polyhydrocarbyl amine detergents, quaternary ammonium detergents, bis-aminotriazole detergents as generally described in U.S. Pat. No. 8,529,643 and a reaction product of a hydrocarbyl substituted dicarboxylic acid, or anhydride and an aminoguanidine, wherein the reaction product has less than one equivalent of amino triazole group per molecule as generally described in U.S. Pat. Nos. 8,758,456 and 8,852,297.

When formulating the fuel compositions of this application, the additives may be employed in amounts sufficient to reduce or inhibit deposit formation in a fuel system or combustion chamber of an engine and/or crankcase. In some aspects, the fuels may contain minor amounts of the above described reaction product that controls or reduces the formation of engine deposits, for example injector deposits in diesel engines. For example, diesel fuels of this disclosure may contain, on an active ingredient basis, an amount of the quaternary ammonium salt in the range of about 1 mg to about 100 mg of quaternary ammonium salt per Kg of fuel, such as in the range of about 5 mg to about 50 mg of per Kg of fuel or in the range of from about 5 mg to about 25 mg of the quaternary ammonium salt per Kg of fuel. The active ingredient basis excludes the weight of (i) unreacted components associated with and remaining in the product as produced and used, and (ii) solvent(s), if any, used in the manufacture of the product either during or after its formation.

The additives of the present application, including the esterified quaternary ammonium salt described above, and optional additives used in formulating the fuels of this invention may be blended into the base diesel fuel individually or in various sub-combinations. In some embodiments, the additive components of the present application may be blended into the fuel concurrently using an additive concentrate, as this takes advantage of the mutual compatibility and convenience afforded by the combination of ingredients when in the form of an additive concentrate. Also, use of a concentrate may reduce blending time and lessen the possibility of blending errors.

The fuels of the present application may be applicable to the operation of diesel or gasoline engines. The engines include both stationary engines (e.g., engines used in electrical power generation installations, in pumping stations, etc.) and ambulatory engines (e.g., engines used as prime movers in automobiles, trucks, road-grading equipment, military vehicles, etc.). For example, the fuels may include any and all gasoline fuels, middle distillate fuels, diesel fuels, biorenewable fuels, biodiesel fuel, fatty acid alkyl ester, gas-to-liquid (GTL) fuels, jet fuel, alcohols, ethers, kerosene, low sulfur fuels, synthetic fuels, such as Fischer-Tropsch fuels, liquid petroleum gas, bunker oils, coal to liquid (CTL) fuels, biomass to liquid (BTL) fuels, high asphaltene fuels, fuels derived from coal (natural, cleaned, and petcoke), genetically engineered biofuels and crops and extracts therefrom, and natural gas. "Biorenewable fuels" as used herein is understood to mean any fuel which is derived from resources other than petroleum. Such resources include, but are not limited to, corn, maize, soybeans and other crops; grasses, such as switchgrass, miscanthus, and hybrid grasses; algae, seaweed, vegetable oils; natural fats; and mixtures thereof. In an aspect, the biorenewable fuel can comprise monohydroxy alcohols, such as those comprising from 1 to about 5 carbon atoms. Non-limiting examples of suitable monohydroxy alcohols include methanol, ethanol, propanol, n-butanol, isobutanol, t-butyl alcohol, amyl alcohol, and isoamyl alcohol.

Accordingly, aspects of the present application are directed to methods for reducing the amount of injector deposits of engines having at least one combustion chamber and one or more direct fuel injectors in fluid connection with the combustion chamber. In another aspect, the esterified quaternary ammonium salts described herein or fuel containing the esterified quaternary ammonium salt may be combined with polyhydrocarbyl-succinimides, -Mannich compounds, -acids, -amides, -esters, -amide/acids and -acid/esters.

In some aspects, the methods comprise injecting a hydrocarbon-based compression ignition fuel comprising a quaternary ammonium salt of the present disclosure through the injectors of the diesel engine into the combustion chamber, and igniting the compression ignition fuel. In some aspects, the method may also comprise mixing into the diesel fuel at least one of the optional additional ingredients described above.

In one embodiment, the fuels of the present application may be essentially free, such as devoid, of polyhydrocarbyl-succinimides, -Mannich compounds, -acids, -amides, -esters, -amide/acids and -acid/esters. In another embodiment, the fuel is essentially free of a quaternary ammonium salt of a hydrocarbyl succinimide or quaternary ammonium salt of a hydrocarbyl Mannich compound. The term "essentially free" is defined for purposes of this application to be concentrations having substantially no measurable effect on injector cleanliness or deposit formation.

EXAMPLES

The following examples are illustrative of exemplary embodiments of the disclosure. In these examples as well as elsewhere in this application, all parts and percentages are by weight unless otherwise indicated. It is intended that these examples are being presented for the purpose of illustration only and are not intended to limit the scope of the invention disclosed herein.

Comparative Example 1

A commercial additive containing a propoxylated quaternary ammonium salt believed to be made from a polyisobutylsuccinimide (PIBSI) which is prepared by reacting polyisobutylene succinic anhydride (PIBSA) and dimethylaminopropyl amine (DMAPA) according to Comparative Example 1 of U.S. Patent Publication No. 2012/0138004.

Comparative Example 2

A PIBSI (comparative example 1, about 248 grams) was reacted with 1,2-butylene oxide (34.6 grams), acetic acid, (17.3 grams) and a mixed solvent of 2-ethylhexanol (18 grams) and isopropanol (64 grams) at a temperature of 50° C. for one hour, 55° C. for two hours, 60° C. for two hours and 65° C. for five hours. Volatiles were removed under reduced pressure to give a brownish oil.

Comparative Example 3

A mixture of oleylamido propyl dimethylamine, propylene oxide (1 equivalent), and oleic acid (1 equivalent) in methanol was reacted at about 50° C. in a pressured vessel until all propylene oxide was consumed. Volatiles were removed to give product as a brownish paste Comparative Example 4

A product was made similarly to that of the reaction product of Comparative Example 3 with the exception that ethylene oxide was use in place of propylene oxide. The resulting product is a brownish paste.

Comparative Example 5

A mixture of dimethyl oleyl amine (113 grams), 1,2-butylene oxide (55 grams), and acetic anhydride (39 grams) was heated at 50° C. for 1.5 hours, then at 60° C. for 1.5 hours, and then at 75° C. for six hours. Volatiles were removed under reduced pressure. A C13-NMR spectrum of the resulting mixture showed that the mixture contained mostly unreacted dimethyl oleyl amine with an insignificant amount of quaternary ammonium compound along with many unspecified species.

Inventive Example 1

Acetic anhydride (10 grams) was added to a mixture of Comparative Example 3 (46 grams) and toluene (46 grams) in a reaction vessel with a magnetic stir bar. The mixture was stirred at room temperature and became warm likely due to the exothermic reaction. Volatiles were removed under reduced pressure to give product as a free flowing brown oil. An FTIR analysis showed a strong absorption peak at 1743 $cm^{-1}$ consistent with ester functionality. The reduced viscosity of the additive was due to the removal of the hydroxyl group (OH) from the starting alkoxylated quaternary ammonium compound.

Inventive Example 2

A 1000 MW polyisobutylene succinic anhydride (PIBSA, 104 grams) in aromatic solvent 150 (66 grams) was added to the product of Comparative Example 3 (64 grams) in a reaction vessel. The mixture was shaken at room temperature for 2 hours. The reaction vessel warmed up during shaking. The resulting product was a brown oil with an average number of molecular weight of 1700 (according to gel permeation chromatography measurement).

Inventive Example 3

Acetic anhydride (0.74 grams) was added to a mixture of Comparative Example 4 (5 grams) as a 50% by weight solution in an aromatic solvent in a reaction vessel with a magnetic stir bar. The mixture was stirred at room temperature to give the alkoxylated quaternary ammonium ester compound. An FTIR analysis showed a strong absorption peak at 1748 $cm^{-1}$.

Inventive Example 4

Alkenyl succinic anhydride derived from a $C_{20-24}$ terminal olefin (11.5 grams) was added to the product of Comparative Example 4 (19 grams) as a 50% by weight solution in an aromatic solvent in a reaction vessel with a magnetic stir bar. The mixture turned warm. The FTIR analysis of the resulting alkoxylated quaternary ammonium ester compound showed a strong absorption peak at 1736 $cm^{-1}$.

Inventive Example 5

An 1000 MW PIBSA (108 grams) in an aromatic solvent (108 grams) was added to the product of Comparative Example 4 (48 grams) as a 50% by weight solution in an aromatic solvent in a reaction vessel. The mixture turned warm. The resulting quaternary ammonium compound was a brown oil with an average number of molecular weight of 1637.

Inventive Example 6

A mixture of dimethyl oleyl amine (148 grams), 1,2-butylene oxide (54 grams), acetic acid (30 grams), and acetic anhydride (61 grams) was stirred at 55° C. for 2.5 hours, 65° C. for 2 hours, and 70° C. for 2 hours. An FTIR analysis of the reaction mixture showed a strong peak at 1742 $cm^{-1}$ consistent with an ester group. Volatiles were removed under reduced pressure to give product as a brownish oil of low viscosity. C13-NMR analysis showed a mixture containing the desired quaternary ammonium ester.

Inventive Example 7

A mixture of oleyl amido propyl dimethylamine (71 grams), butyl glycidyl ether (27 grams), 750MW PIBSA (182 grams), and acetic acid (11.4 grams) in xylene (20 grams) was stirred at 60° C. for 5 hours, and 65° C. for 1 hour. An FTIR analysis of the reaction mixture showed a strong peak at 1737 $cm^{-1}$ consistent with an ester group. The resulting product was a dark brown viscous oil. C13-NMR analysis showed the mixture contained mostly the desired quaternary ammonium ester.

In the following example, an injector deposit test was performed on a diesel engine using an industry standard diesel engine fuel injector test, CEC F-98-08 (DW10) as described below.

Diesel Engine Test protocol

A DW10 test that was developed by Coordinating European Council (CEC) was used to demonstrate the propensity of fuels to provoke fuel injector fouling and was also used to demonstrate the ability of certain fuel additives to prevent or control these deposits. Additive evaluations used the protocol of CEC F-98-08 for direct injection, common rail diesel engine nozzle coking tests. An engine dynamometer test stand was used for the installation of the Peugeot DW10 diesel engine for running the injector coking tests. The engine was a 2.0 liter engine having four cylinders. Each combustion chamber had four valves and the fuel injectors were DI piezo injectors have a Euro V classification.

The core protocol procedure consisted of running the engine through a cycle for 8-hours and allowing the engine to soak (engine off) for a prescribed amount of time. The foregoing sequence was repeated four times. At the end of each hour, a power measurement was taken of the engine while the engine was operating at rated conditions. The injector fouling propensity of the fuel was characterized by a difference in observed rated power between the beginning and the end of the test cycle.

Test preparation involved flushing the previous test's fuel from the engine prior to removing the injectors. The test injectors were inspected, cleaned, and reinstalled in the engine. If new injectors were selected, the new injectors were put through a 16-hour break-in cycle. Next, the engine was started using the desired test cycle program. Once the engine was warmed up, power was measured at 4000 RPM and full load to check for full power restoration after cleaning the injectors. If the power measurements were within specification, the test cycle was initiated. The following Table 1 provides a representation of the DW10 coking cycle that was used to evaluate the fuel additives according to the disclosure.

TABLE 1

One hour representation of DW10 coking cycle.

| Step | Duration (minutes) | Engine speed (rpm) | Load (%) | Torque (Nm) | Boost air after Intercooler (° C.) |
|---|---|---|---|---|---|
| 1 | 2 | 1750 | 20 | 62 | 45 |
| 2 | 7 | 3000 | 60 | 173 | 50 |
| 3 | 2 | 1750 | 20 | 62 | 45 |
| 4 | 7 | 3500 | 80 | 212 | 50 |
| 5 | 2 | 1750 | 20 | 62 | 45 |
| 6 | 10 | 4000 | 100 | * | 50 |
| 7 | 2 | 1250 | 10 | 25 | 43 |
| 8 | 7 | 3000 | 100 | * | 50 |
| 9 | 2 | 1250 | 10 | 25 | 43 |
| 10 | 10 | 2000 | 100 | * | 50 |
| 11 | 2 | 1250 | 10 | 25 | 43 |
| 12 | 7 | 4000 | 100 | * | 50 |

Various fuel additives were tested using the foregoing engine test procedure in an ultra low sulfur diesel fuel containing zinc neodecanoate, 2-ethylhexyl nitrate, and a fatty acid ester friction modifier (base fuel). A "dirty-up" phase consisting of base fuel only with no additive was initiated, followed by a "clean-up" phase consisting of base fuel with additive. All runs were made with 8 hour dirty-up and 8 hour clean-up unless indicated otherwise. The percent power recovery was calculated using the power measurement at end of the "dirty-up" phase and the power measurement at end of the "clean-up" phase. The percent power recovery was determined by the following formula Percent Power recovery=$(DU-CU)/DU \times 100$ wherein DU is a percent power loss at the end of a dirty-up phase without the additive, CU is the percent power at the end of a clean-up phase with the fuel additive, and power is measured according to CEC F98-08 DW10 test.

TABLE 2

| Run | Additives and treat rate (ppm by weight) | Power loss % DU | Power CU | Power recovery % (DU − CU)/ DU × 100 | Additive Efficiency Power Recovery %/ppm |
|---|---|---|---|---|---|
| 1 | Comparative Example 1 - PIBSI derived quaternary ammonium salt (75 ppm) | −5.2 | −1.43 | 73 | 0.97 |
| 2 | Compound of Comparative Example 2 (75 ppm) | −4.72 | −0.36 | 92 | 1.23 |
| 3 | Compound of Comparative Example 3 (30 ppm) | −4.25 | 0.5 | 112 | 3.73[1] |
| 4 | Compound of Inventive Example 2 (75 ppm) | −6.47 | 1.37 | 121 | 1.61 |

In Table 2, the "Additive Efficiency" is the percent power recovery for each part per million of additive in the fuel. As shown by comparing the inventive example of Run 4 to the Comparative Examples 1-2, the inventive example have an unexpectedly much greater efficiency in restoring power than the comparative examples with no injector sticking Comparative Example 3 had the greatest power recovery, but the additive resulted in stuck fuel injectors. In other words, the additive of Comparative Example 3 contributed to injector fouling whereas the additive of Inventive Example 2 not only provided superior power recovery, but also did not contribute to injector deposits or fouling.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fuel soluble additive for a fuel injected engine comprising an esterified quaternary ammonium salt derived from a tertiary amine, an epoxide, a proton donor and an anhydride, wherein the esterified quaternary ammonium salt is formed subsequent to forming the quaternary ammonium salt.

2. The fuel additive of claim 1, wherein the proton donor is selected from the group consisting of a carboxylic acid and an alkyl phenol.

3. The fuel additive of claim 1, wherein the amine comprises an amido amine derived from an acid having from about 1 to about 54 carbon atoms.

4. The fuel additive of claim 1, wherein the epoxide is selected from the group consisting of a hydrocarbyl epoxide of the formula

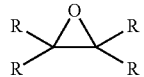

wherein each R is independently selected from H and a $C_1$ to $C_{50}$ hydrocarbyl group, and polyepoxides.

5. The fuel additive of claim 1, wherein the hydrocarbyl epoxide is selected from the group consisting of styrene oxide, ethylene oxide, propylene oxide, butylene oxide, 1,2-epoxycyclohexane, 2,3-epoxy-5-methylhexane, stilbene oxide, and $C_5$ to $C_{200}$ epoxide.

6. The fuel additive of claim 2, wherein the proton donor is a selected from the group consisting of fatty acids, formic acid, acetic acid, propionic acid, butyric acid, polyisobutenyl succinic acid, amide/acid, or acid/ester, and polymeric acids, and mixtures thereof.

7. The fuel additive of claim 1, wherein the anhydride is selected from the group consisting of cyclic and non-cyclic anhydrides.

8. The fuel additive of claim 7, wherein the anhydride is selected from the group consisting of acetic anhydride, succinic anhydride, polyisobutenyl succinic anhydride, phthalic anhydride, and $C_{20-24}$ alkenyl succinic anhydride.

9. A diesel fuel composition comprising from about 5 to about 100 ppm of the fuel additive of claim 1 based on a total weight of the fuel composition.

10. A diesel fuel composition comprising from about 10 to about 50 ppm of the fuel additive of claim 1 based on a total weight of the fuel composition.

11. A method of improving the injector performance of a fuel injected engine, comprising operating the engine on a fuel composition containing a major amount of fuel and from about 5 to about 100 ppm by weight based on a total weight of the fuel composition of an esterified quaternary ammonium salt derived from a tertiary amine, an epoxide, an anhydride and a proton donor selected from a carboxylic acid and an alkyl phenol, wherein the esterified quaternary ammonium salt is formed subsequent to forming the quaternary ammonium salt.

12. The method of claim 11, wherein the engine comprises a direct fuel injected diesel engine.

13. The method of claim 11, wherein the engine comprises a directed injected gasoline engine.

14. The method of claim 11, wherein the amine comprises an amido amine derived from acid having from about 1 to about 54 carbon atoms.

15. The method of claim 11, wherein the epoxide is selected from the group consisting of a hydrocarbyl epoxide of the formula

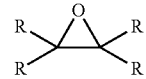

wherein each R is independently selected from H and a $C_1$ to $C_{50}$ hydrocarbyl group, and polyepoxides.

16. The method of claim 11, wherein the proton donor is selected from the group consisting of fatty acids, formic acid, acetic acid, propionic acid, butyric acid, polyisobutenyl succinic acid, acid/amide, or acid/ester, and polymeric acids, and mixtures thereof.

17. The method of claim 11, wherein the fuel composition contains from about 10 to about 50 ppm of the esterified quaternary ammonium salt based on a total weight of the fuel composition.

18. The method of claim 11, wherein the anhydride is selected from the group consisting of acetic anhydride, succinic anhydride, polyisobutenyl succinic anhydride, phthalic anhydride, and $C_{20-24}$ alkenyl succinic anhydride.

19. A method for making an esterified quaternary ammonium salt fuel additive comprising reacting a tertiary amine in the presence of an epoxide, a carboxylic acid and an anhydride, wherein the esterified quaternary ammonium salt is formed subsequent to forming the quaternary ammonium salt.

* * * * *